(12) United States Patent
Ould et al.

(10) Patent No.: US 11,846,497 B2
(45) Date of Patent: Dec. 19, 2023

(54) MEASUREMENT METHOD AND APPARATUS

(71) Applicant: RENISHAW PLC, Wotton-under-Edge (GB)

(72) Inventors: John Charles Ould, Backwell Farleigh (GB); Thomas Phillip Handford, Bristol (GB)

(73) Assignee: RENISHAW PLC, Wotton-Under-Edge (GB)

( * ) Notice: Subject to any disclaimer, the term of this patent is extended or adjusted under 35 U.S.C. 154(b) by 569 days.

(21) Appl. No.: 17/059,780

(22) PCT Filed: Jun. 10, 2019

(86) PCT No.: PCT/GB2019/051614
§ 371 (c)(1),
(2) Date: Nov. 30, 2020

(87) PCT Pub. No.: WO2019/239119
PCT Pub. Date: Dec. 19, 2019

(65) Prior Publication Data
US 2021/0207938 A1   Jul. 8, 2021

(30) Foreign Application Priority Data
Jun. 12, 2018   (GB) .................................... 1809631

(51) Int. Cl.
*G01B 5/016* (2006.01)
*G01P 15/18* (2013.01)
*G01P 1/00* (2006.01)

(52) U.S. Cl.
CPC .............. *G01B 5/016* (2013.01); *G01P 15/18* (2013.01); *G01P 1/00* (2013.01)

(58) Field of Classification Search
CPC ...... G01B 5/016; G01B 5/008; G01B 21/042; G01P 15/18; G01P 1/00
See application file for complete search history.

(56) References Cited

U.S. PATENT DOCUMENTS

| | | |
|---|---|---|
| 4,084,323 A | 4/1978 | McMurtry |
| 4,153,998 A | 5/1979 | McMurtry |

(Continued)

FOREIGN PATENT DOCUMENTS

| | | |
|---|---|---|
| CN | 101384879 A | 3/2009 |
| CN | 102686974 A | 9/2012 |

(Continued)

OTHER PUBLICATIONS

Jul. 26, 2019 International Search Report issued in International Patent Application No. PCT/GB2019/051614.

(Continued)

*Primary Examiner* — Yaritza Guadalupe-McCall
(74) *Attorney, Agent, or Firm* — Oliff PLC

(57) ABSTRACT

Method for measuring an object using a scanning probe carried by a machine tool having a probe holder for the scanning probe and a carrier for the object. The method includes (i) using the machine tool to move the probe holder relative to the carrier along a pre-programmed scan path, (ii) measuring acceleration whilst the pre-programmed scan path is traversed, (iii) collecting probe data whilst the pre-programmed scan path is traversed, and (iv) using the acceleration measured to identify at least one acceleration zone of the pre-programmed scan path and thereby determine one or more positions along the scan path at which the probe data of step (iii) were collected.

20 Claims, 7 Drawing Sheets

(56) References Cited

U.S. PATENT DOCUMENTS

| | | | |
|---|---|---|---|
| 5,778,549 A | 7/1998 | Campanile | |
| 6,308,108 B1 | 10/2001 | Michiwaki et al. | |
| 7,779,553 B2* | 8/2010 | Jordil | G01B 3/008 |
| | | | 33/558 |
| 7,861,430 B2 | 1/2011 | Jonas et al. | |
| 8,627,576 B2 | 1/2014 | Engel | |
| 9,046,335 B2 | 6/2015 | Fuchs et al. | |
| 9,726,482 B2 | 8/2017 | Iseli et al. | |
| 9,739,607 B2 | 8/2017 | Michiwaki | |
| 10,037,017 B2* | 7/2018 | Wooldridge | G05B 19/401 |
| 10,678,208 B2* | 6/2020 | Wooldridge | G05B 19/401 |
| 10,775,148 B2 | 9/2020 | Gruber et al. | |
| 11,163,288 B2 | 11/2021 | Marshall et al. | |
| 11,441,891 B2* | 9/2022 | Staaden | G01B 21/04 |
| 2008/0189969 A1* | 8/2008 | Fuchs | G01B 21/045 |
| | | | 33/503 |
| 2010/0050837 A1* | 3/2010 | Ould | G01B 21/042 |
| | | | 83/13 |
| 2011/0246132 A1 | 10/2011 | Sato et al. | |
| 2012/0246953 A1 | 10/2012 | Engel | |
| 2012/0303320 A1 | 11/2012 | Michiwaki | |
| 2016/0041547 A1 | 2/2016 | Mackman et al. | |
| 2018/0106586 A1 | 4/2018 | Gruber et al. | |
| 2019/0178618 A1* | 6/2019 | McMurtry | G01B 5/012 |
| 2021/0180932 A1* | 6/2021 | Itakura | G05B 19/401 |
| 2021/0207938 A1* | 7/2021 | Ould | G01P 15/18 |
| 2023/0152074 A1* | 5/2023 | Gruber | G01B 21/045 |
| | | | 702/152 |

FOREIGN PATENT DOCUMENTS

| | | |
|---|---|---|
| CN | 105716559 A | 6/2016 |
| CN | 107743431 A | 2/2018 |
| DE | 10 2010 018 250 A1 | 10/2011 |
| EP | 3 519 766 B1 | 11/2020 |
| JP | H07-210586 A | 8/1995 |
| JP | H09-126807 A | 5/1997 |
| JP | 2012-247312 A | 12/2012 |
| JP | 2014-048095 A | 3/2014 |
| JP | 2018-066731 A | 4/2018 |
| JP | 2019-533142 A | 11/2019 |
| WO | 2005/031254 A1 | 4/2005 |
| WO | 2009/112819 A2 | 9/2009 |

OTHER PUBLICATIONS

Jul. 26, 2019 Written Opinion issued in International Patent Application No. PCT/GB2019/051614.

* cited by examiner

MEASUREMENT METHOD AND APPARATUS

The present invention relates to a method and apparatus for aligning scanning probe data to position along a pre-programmed scan path using measured acceleration.

It is known to mount a measuring probe in a machine tool spindle, for movement with respect to a workpiece, in order to measure the workpiece. In practice, the probe has typically been a touch trigger probe, e.g. as described in U.S. Pat. No. 4,153,998, which produces a trigger signal when a stylus of the probe contacts the workpiece surface. This trigger signal is fed to a so-called "skip" input of the machine tool's numeric controller. In response to a received trigger signal, the controller takes an instantaneous reading of the machine's position (i.e. the position of the spindle and the probe relative to the machine). This is taken from measurement devices of the machine such as encoders or resolvers which provide position feedback information in a servo control loop for the machine's movement.

In the field of coordinate measuring machines (CMMs), it is known to measure workpieces using either a touch trigger probe as described above, or a scanning probe. One known type of scanning probe (sometimes called an analogue probe) has a stylus for contacting the workpiece surface, and transducers within the probe which measure the deflection of the stylus relative to the probe body. An example is shown in U.S. Pat. No. 4,084,323. This enables much more detailed measurements of the form of the workpiece surface than can conveniently be performed with a trigger probe. In use the probe is moved relative to the workpiece surface, so that the stylus scans the surface. During scanning continuous readings are taken of the outputs of the probe transducers, and of the outputs of the encoders or other measurement devices of the machine. By combining the instantaneous probe output and the instantaneous machine output, digitised coordinate data is obtained for the position of the workpiece surface at a very large number of points throughout the scanning motion.

It has hitherto been difficult to use an analogue or scanning probe effectively on a machine tool, in the way just described for CMMs. One reason lies in the limitations of commercially-available machine tool controllers. It will be noted that the scanning method described above on a CMM requires that the position data from the machine's encoders or other measuring devices should be continuously available, at a high data rate, so that it can be added to the probe outputs for each data point in the scan. Conventional machine tool controllers are incapable of this. Their "skip" inputs cannot operate at the required high data rate. Thus, to perform scanning at a reasonable speed, it has been necessary to modify the controller, e.g. to enable direct sampling of data in the servo feedback loop, from the outputs of the machine's encoders or other measuring devices. However, such modifications to the controller vary from one controller to another and may not be easy, or may not even be possible.

Previous attempts to provide machine tools with a scanning function without modification of the machine tool's controller include that disclosed in WO 2005/031254. Here a probing system is advanced along a pre-defined path in order to move the probing system relative to a workpiece, deflections of a stylus caused by interaction with the workpiece are continuously measured and are combined with an assumed position of the probing system along the pre-defined path. The use of an assumed position of the probing system along the pre-defined path provides a means to pair stylus deflection data with assumed a probe position.

According to a first aspect of the present invention there is provided a method for measuring an object using a scanning probe carried by a machine tool, the machine tool having a probe holder for retaining the scanning probe and a carrier for carrying the object to be measured, the method comprising the steps of;

(i) using the machine tool to move the probe holder relative to the carrier along a pre-programmed scan path, the pre-programmed scan path comprising at least one first region where the movement along the pre-programed scan path is at a first feedrate, at least one second region where the movement along the pre-programed scan path is at a second feedrate, and at least one acceleration zone located between the at least one first region and the at least one second region, (ii) measuring acceleration between the probe holder and the carrier using at least one accelerometer whilst the pre-programmed scan path is traversed, (iii) collecting probe data whilst the pre-programmed scan path is traversed with the scanning probe retained by the probe holder and the object carried by the carrier, the scanning probe thereby scanning the surface of the object, and (iv) using the acceleration measured in step (ii) to identify at least one acceleration zone of the pre-programmed scan path and thereby determine one or more positions along the scan path at which the probe data of step (iii) were collected.

The present invention relates to a method for measuring an object, e.g. a workpiece using a scanning probe mounted on a machine tool. The machine tool may be a fixed powered tool for machining an object. For example, the machine tool may be a machining centre, a lathe, a miller, or a grinder. The machine tool can thus be for cutting, shaping, and/or finishing an object. As explained above, machine tools may not provide access to machine position data in real time.

The scanning probe that is carried by the machine tool may be a contact probe. For example, a contact probe may comprise a housing, a stylus for contacting an object to be measured and one or more transducers for measuring deflection of the stylus relative to the housing. Alternatively, the scanning probe may be a non-contact probe, for example an optical or inductive probe. The scanning probe may output or stream probe data, for example, to a remote probe interface. The probe data may be stylus deflection data. The stylus deflection data may comprise the magnitude of deflection and may further comprise information about the direction of stylus deflection. The scanning probe may output or stream the probe data wirelessly, for example optically or using radio waves, such as ultra-high frequency (UHF) radio waves having a frequency between 2.4 and 2.485 GHz or 5.8 GHz super-high frequency (SHF) ISM band. The scanning probe may output or stream probe data via a wired connection. The use of wireless communication can allow the use of a measurement probe with a machine tool where no wired connection is provided by the machine tool and without the need to retro fit such a wired connection. The method may comprise passing the acceleration data of step (ii) and the probe data of step (iii) to an associated probe interface over a wireless communications link.

The pre-programmed scan path of the method may be a scan path set by a user. The pre-programmed scan path may, when the scanning probe is held by the probe holder and the object to be measured is carried by the carrier, bring the scanning probe and object to be measured into a measurement relationship and move the scanning probe and object to be measured relative to each other in order to measure the surface of the object to be measured. Traversing of the pre-programmed scan path may be controlled by a numeric control (NC) of the machine tool.

Different types of machine tool may impart relative motion between the carrier and probe holder in a different way. The relative motion may comprise moving the probe holder while the carrier remains stationary. Alternatively it may involve moving the carrier while the probe holder remains stationary. It would also be possible to move both the probe holder and carrier. The speed of the relative motion is commonly called the 'feedrate'. The feedrate may be the speed of the probe holder and/or scanning probe relative to the carrier and/or object to be measured as the pre-programmed scan path is traversed.

The acceleration measured in step (ii) may be positive and/or may it be negative (i.e. deceleration). An acceleration zone may be a section of the pre-programmed tool path between a location along the pre-programmed tool path where a change in feedrate is commanded (e.g. a feedrate is commanded that is different to a current feedrate) and a location along the pre-programmed tool path where the commanded feedrate is achieved. The probe holder may accelerate relative to the carrier while an acceleration zone is traversed as part of the pre-programmed tool path. The first feedrate may be the same as the second feedrate, for example where a change of direction is brought about by acceleration of the probe holder.

In step (iv), the acceleration that is measured in step (ii) is used to identify the acceleration zone or zones of the scan path. This allows one or more portions along the scan path to be identified. These identified positions can then be used with corresponding probe data to determine the position of probe data on the surface of the object. The use of such identified positions provides a more accurate measurement of an object when compared to the prior art methods such as that disclosed by WO 2005/031254. In particular, the invention can allow a scanning probe to be used on a machine tool without the need to obtain position data from the machine tool. This can allow a quicker measurement and set-up process and may also allow the use of scanning probes with previously incompatible machine tools. The invention is thus to use the measured acceleration to identify points or positions along the scan path where such acceleration is expected. For example, the position of acceleration zones between the sections of different feedrate. The probe data can be aligned along the scan path using positions identified from the accelerometer data (e.g. the probe data may be assigned a position along the pre-programmed scan path based on time of obtaining probe data and position information based on the acceleration data measured using the accelerometer).

A first part of the machine tool comprising the probe holder may be moveable relative to a second part of the machine tool comprising the carrier. The first part may also comprise a tool holder. In a preferred embodiment the probe holder is provided by the tool holder (i.e. the probe holder can retain both a cutting tool and a scanning probe). Advantageously, the probe holder may be a machine tool spindle for receiving a tool shank (e.g. a HSK shank or similar). The probe may then be mounted to such a tool shank to allow it to be retained by the spindle. The carrier may form part of the machine tool or the carrier may be a separate device. For example, the carrier may be a rotary table or a fixture placed on the machine tool bed.

As explained above, step (iii) is necessarily performed with the scanning probe retained by the probe holder and the object carried by the carrier to allow the object to be scanned. Optionally step (ii) is performed with the scanning probe in the probe holder. Conveniently step (ii) may be performed with the object to be measured carried by the carrier. It is also possible to measure the acceleration between the probe holder and the carrier in step (ii) with or without the scanning probe in the probe holder, and/or with or without the object to be measured being carried by the carrier. If step (ii) is carried out without the scanning probe in the probe holder, the acceleration of the probe holder relative to the carrier is monitored.

Optionally measuring acceleration between the probe holder and the carrier in step (ii) is carried out without the scanning probe being held by the probe holder. Optionally measuring acceleration between the probe holder and carrier is step (ii) is carried out without the object to be measured being carried by the carrier. This allows an acceleration pass to be carried out prior to (or subsequent) the scanning probe being mounted to the probe holder and/or the object to be measured being mounted to the carrier. Thus, the acceleration to be measured once and used to determine one or more positions along the scan path at which probe data were collected for a plurality of objects to be measured (e.g. a plurality of instances of objects to be measured). Measuring acceleration between the probe holder and the carrier with the scanning probe being held by the probe holder and with the object to be measured being carried by the carrier may allow probe data to be obtained in the same traverse of the pre-programmed scan path as measuring acceleration. Thus step (ii) and step (iii) can be performed concurrently.

The feedrate may be the commanded speed of the pre-programmed scan path. The first feedrate may be different to the second feedrate so as to have an acceleration zone located therebetween. Optionally the second feedrate is higher than the first feedrate.

Measuring acceleration in step (ii) may use one or more accelerometers in the scanning probe, and/or on the probe holder, and/or on the object carrier. The one or more accelerometers may comprise at least one liner accelerometer and/or at least one rotational accelerometer. The one or more accelerometers may be bespoke accelerometers. A plurality of accelerometers may be provided.

Measuring acceleration may comprise measuring acceleration at a pre-defined interval. The predefined interval may be a time-based interval, for example the acceleration may be measured at least every 25 ms (40 Hz), optionally at least every 12.5 ms (80 Hz), optionally at least every 10 ms (100 Hz), optionally at least every 1 ms (1 kHz), optionally in the range 1 ms to 10 ms, optionally at 1.7 ms or 1.77 ms. The acceleration may be measured at time intervals shorter than 1 ms. Measuring probe data may comprise measuring probe data at a pre-defined interval. The predefined interval may be a time-based interval, for example at least every 25 ms (40 Hz), optionally at least every 12.5 ms (80 Hz), optionally at least every 10 ms (100 Hz), optionally at least every 1 ms (1 kHz), optionally in the range 1 ms to 10 ms, optionally at least every 1.7 ms or 1.77 ms. The probe data may be taken at time intervals shorter than 1 ms. The probe data may be read continuously. The acceleration may be measured at the same sample rate as the probe data. The acceleration may be measured at a different sample rate compared with the probe data. By knowing the time base of the measured acceleration and the time base of the probe data, a relationship between when measured acceleration occurred and when probe data occurred can be established.

Optionally the pre-programmed scan path comprises an engagement section in which the scanning probe is brought into a measurement relationship with the object to be measured. For a contact scanning probe, the engagement section may involve moving the scanning probe stylus into contact with the object to be measured. During the engagement section, the stylus of such a contact probe may be deflected from an initial position to an engagement section maximum deflection, such a deflection of the stylus may be relative to a housing of the contact probe. The engagement section may provide movement of the measurement probe relative to the object to be measured that can be used to identify a common point in time in the measured acceleration and the probe data. This can allow a relationship between when measured acceleration occurred and when probe data occurred to be established.

Optionally a dwell is provided after the engagement section. The dwell may be a momentary stop in the relative movement between the probe holder and the carrier. The dwell may be less than 1 s, more preferably less than 0.5 s, more preferably less than 0.1 s. The dwell may be at least about 0.05 s. The dwell may be less than 0.05 s. Providing a dwell after the engagement section can ensure that the probe is positioned in the desired place at the end of the engagement section. A break in the probe data record may be provided at abrupt changes in direction of the probe path. This break in probe data can be used to ensure that any abrupt change in direction is taken into account when processing the data.

As mentioned above, the probe data and measured acceleration may be collected using different time bases (e.g. different clocks). The time base of the measured acceleration and the time base of the probe data may be matched based on measured acceleration and probe data characteristic of an engagement section. In other words, the time bases may be synchronised with one another using the engagement section as an identifiable feature.

A clock may be provided for controlling the sampling rate of the probe data and/or acceleration. The scanning probe may comprise a clock. A clock may be provided via a radio receiver or other wireless communications. A clock may be provided via a hard-wired link, for example the machine tool controller or from the probe interface unit. The clock may allow measurement of probe data and acceleration data to conform to a common time base. If the scanning probe comprises an accelerometer (or accelerometers), a common clock may be used for collecting probe data in step (iii) and acceleration in step (ii).

Aliasing of high frequency noise (one possible source of which is the machine tool) into lower frequencies may be prevented using an anti-aliasing means. For example, by sampling the acceleration at a sufficiently high rate or by the accelerometer incorporating an analogue filter which attenuates any signal of a frequency greater than half the sampling frequency (the Nyquist frequency).

A correction may be applied to the acceleration and/or to information derived therefrom. The correction may assume that a commanded feedrate is known. The correction may further assume that the commanded feedrate is achieved at the end of the acceleration zone. The correction may also assume that the commanded feedrate prior to the acceleration zone is known and has been achieved. The correction may be based on at least one known reference position. For example, the at least one known reference position may be the end of the engagement section and/or the end of the pre-programmed scan path and/or before any disengagement section. In other words, it may be assumed that the relative speed of the probe holder and the carrier at the start and end of an acceleration zone will adopt the commanded feedrate values. For example, the first feedrate and the second feed rate may be assumed to be known when the correction to the acceleration (and/or to information derived therefrom) is applied.

A correction may be applied to feedrate information and/or position information derived from the measured acceleration. Optionally a correction is applied to acceleration information and/or feedrate information and/or position information. The applied correction may be a single correction or may comprise a series of corrections which may be sequentially applied. For example, a correction may be applied to the measured acceleration (or to the feedrate derived from the measured acceleration) so that the feedrate represents a physically realistic feedrate (e.g. no regions of infinite acceleration).

Position information derived from the corrected feedrate may be corrected to ensure that the position information represents a physically realistic situation without causing the associated feedrate to represent a physically unreal situation. Such a correction may be cubic and applied to position information (or any mathematical equivalent). By applying a correction to the measured acceleration or information derived therefrom the measured data can be manipulated to produce realistic movement information for the whole probe path, e.g. applying a correction to feedrate information derived from measured acceleration for an acceleration zone can be used to remove any discontinuity between the derived feedrate information for the acceleration zone and a known feedrate which occurs after an acceleration zone, and/or remove any discontinuity between the derived position information for the acceleration zone and an assumed or estimated position located at an end of an acceleration zone.

The method may comprise the steps of (v) deriving feedrate data from the measured or corrected acceleration collected in the at least one acceleration zone. A step (vi) may also be performed that comprises applying a correction to the feedrate data to ensure the federated data is consistent with the at least one reference position.

Optionally step (ii) is performed during a first traverse of the pre-programmed scan path, and step (iii) is performed during a second traverse of the pre-programmed scan path. That is to say, step (ii) and step (iii) may be performed together. Alternatively, steps (ii) and (iii) may be performed sequentially. For example, the acceleration pass (step (ii)) and the deflection pass (step (iii)) may be separate passes, i.e. the pre-programmed scan path may be traversed twice. The acceleration pass may occur before the object to be measured is carried by the carrier. The acceleration pass may occur after the object to be measured has been removed from the carrier. The acceleration pass may occur whilst the object to be measured is carried by the carrier. Even if the scanning probe alone comprises the accelerometer (or accelerometers) and therefore must be carried by the probe holder during both passes, providing a separate acceleration pass and deflection pass enables the amount of information transmitted per second from the scanning probe to be reduced. This can reduce the power requirements and extend the battery life of the measurement probe. Providing a separate acceleration pass and deflection pass can allow step (ii) to comprise multiple passes from which an average acceleration can be calculated. Furthermore, step (iii) may include multiple passes in order to obtain average probe deflection. The measured acceleration from one or more acceleration passes may be combined with probe data for one or more deflection passes.

The measured acceleration collected in a traverse of the probe path where probe data is also collected may be combined with probe data from a subsequent (or previous)

deflection pass. Instead of separate passes, it is possible to collect probe data and acceleration data simultaneously, i.e. step (ii) and step (iii) may be collected during a single traverse of the scan path.

Optionally a threshold is set which avoids erroneous identification of an acceleration zone. The threshold may be set based on a difference in feedrate between the first feedrate and the second feedrate. The pre-programmed scan path is optionally selected such that the difference between the first feedrate and the second feedrate is at least 300 mm/minute. Optionally the difference between the first feedrate and the second feedrate is less than 300 mm/minute. The pre-programmed scan path may be selected such that the maximum acceleration of the measurement probe relative to the object to be measured is at least 5 milli-g. Optionally the maximum acceleration of the measurement probe relative to the object to be measured is less than 5 milli-g. Optionally the maximum acceleration of the measurement probe relative to the object to be measured is more than 5 milli-g. Selecting the pre-programmed scan path such that acceleration zones have an acceleration value of at least a minimum value can allow thresholds to be set which can avoid erroneous identification of an acceleration zone. Optionally the first feed rate or the second feedrate is zero. Optionally the second feedrate is greater than the first feedrate. Preferably the first feedrate and the second feedrate are non-zero.

The invention also extends to a computer program which, when executed causes the above described method to be implemented. A computer program product storing such a computer program may also be provided.

According to a second aspect of the present invention there is provided an apparatus comprising a machine tool, a scanning probe for acquiring probe data, and a controller, the machine tool having a probe holder for retaining the scanning probe, a carrier for carrying an object to be measured, and at least one accelerometer for measuring acceleration of the probe holder relative to the carrier, the controller being configured to carry out the steps of;
(i) using the machine tool to move the probe holder relative to the carrier along a pre-programmed scan path, the pre-programmed scan path comprising at least one first region where the movement along the pre-programed scan path is at a first feedrate, at least one second region where the movement along the pre-programed scan path is at a second feedrate, and at least one acceleration zone located between the at least one first region and the at least one second region,
(ii) measuring acceleration between the probe holder and the carrier using the at least one accelerometer whilst the pre-programmed scan path is traversed,
(iii) collecting probe data whilst the pre-programmed scan path is traversed with the scanning probe retained by the probe holder and the object carried by the carrier, the scanning probe thereby scanning the surface of the object, and
(iv) using the acceleration measured in step (ii) to identify at least one acceleration zone of the pre-programmed scan path and thereby determine one or more positions along the scan path at which the probe data of step (iii) were collected.

This provides a machine tool having a scanning probe which allows more accurate measurement information to be collected without the need to obtain position data from the machine tool. Advantageously this can allow measurement of an object without needing to ensure that the position data provided by the machine tool is at a high enough rate. This can allow a quicker measurement/set-up process and may also allow the use of measurement probes such as scanning probes with previously incompatible machine tools and may allow more accurate measurement data to be obtained when compared to prior art such as that disclosed in WO 2005/031254.

Optionally the at least one accelerometer is configured to measure acceleration between the scanning probe and the portion of the machine tool to which the object to be measured may be located. Optionally the at least one accelerometer is configured to measure acceleration between at the measurement probe and the object to be measured. The probe may comprise an accelerometer. The carrier may comprise an accelerometer. The probe holder may comprise an accelerometer. The controller may be the machine tool controller.

According to a third aspect of the present invention there is provided a computer implemented method for matching scanning probe data to positions along a pre-programmed scan path, the pre-programmed scan path being the path along which a machine tool probe holder moved relative to a carrier and comprising at least one first region where movement along the pre-programmed scan path is at a first feedrate, at least one second region where the movement along the pre-programmed scan path is at a second feedrate, and at least one acceleration zone located between the at least one first region and the at least one second region, the method comprising the steps of
(i) receiving acceleration data, the acceleration data describing the measured acceleration of the probe holder relative to the carrier whilst the pre-programmed scan path is traversed,
(ii) receiving probe data collected by scanning the probe held by the probe holder whilst the pre-programmed scan path is traversed,
(iii) using the acceleration data received in step (i) to identify at least one acceleration zone of the pre-programmed scan path and to thereby determine one or more positions along the scan path at which the probe data of received in step (ii) were collected.

In step (i) receiving acceleration data measured between the probe holder and the carrier whilst the pre-programmed scan path is traversed may comprise receiving acceleration after measurement of acceleration data is complete. Alternatively, receiving acceleration data measured between the probe holder and the carrier whilst the pre-programmed scan path is traversed of step (i) may comprise receiving at least part of the acceleration data before measurement of acceleration data is complete.

Step (ii) may comprise receiving probe data after collection of probe data is complete. Alternatively, step (ii) may comprise receiving at least part of the probe data before collection of probe data is complete.

A data processing apparatus for implementing the computer implemented method may be provided. A computer program may be provided that, when executed by a computer, implements the method. A computer-readable storage medium is also provided comprising instructions which, when executed by a computer cause the computer to carry out the above described method. The computer implemented method may cause the computer to control a machine tool to carry out the above described method. The computer may form part of the machine tool controller.

Acceleration data may comprise acceleration data time base information. Probe data may comprise probe data time base information. Acceleration data may be derived from at least one accelerometer.

Any feature described above in the context of the method may be included in the apparatus of the second aspect of invention and/or the computer program product of the third aspect of invention.

Also described herein is a method of using probe data to identify an acceleration characteristic of a point on a probe path. Optionally the probe data is deflection data. Optionally the point on the probe path is part of an engagement section. This method may be used to align probe data with acceleration data.

Also described herein is a method for measuring an object using a scanning probe carried by a machine tool, the machine tool having a probe holder for retaining the scanning probe and a carrier for carrying the object to be measured. The method may comprise one or more of the following steps:

(i) Using the machine tool to move the probe holder relative to the carrier along a pre-programmed scan path, the pre-programmed scan path comprising at least one first region where the movement along the pre-programed scan path is at a first feedrate, at least one second region where the movement along the pre-programed scan path is at a second feedrate, and at least one acceleration zone located between the at least one first region and the at least one second region.

(ii) Measuring acceleration between the probe holder and the carrier using at least one accelerometer whilst the pre-programmed scan path is traversed.

(iii) Collecting probe data whilst the pre-programmed scan path is traversed with the scanning probe retained by the probe holder and the object carried by the carrier, the scanning probe thereby scanning the surface of the object.

(iv) Using the acceleration measured in step (ii) to identify at least one acceleration zone of the pre-programmed scan path and thereby determine one or more positions along the scan path at which the probe data of step (iii) were collected.

The method may include one or more steps or features of the other aspects.

The invention will now be described, by way of example only, with reference to the accompanying drawings, in which.

Figure 1:
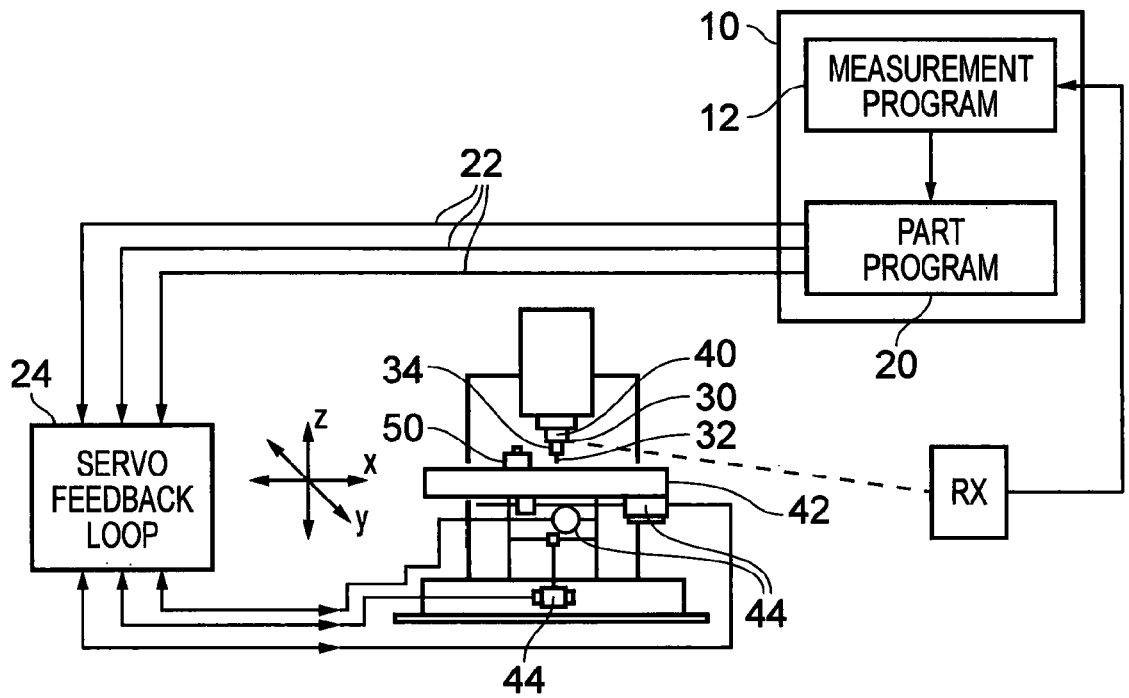
FIG. 1 shows a schematic representation of a machine tool.

FIG. 1 shows a machine tool, comprising a table 42 and a spindle 40 which are movable relative to each other in directions x,y,z, under the action of motors 44. The spindle 40 is moved by motors which are not shown for clarity.

Normally, a cutting tool would be mounted in the spindle 40, however as shown in FIG. 1 a scanning probe is mounted in the spindle 40 in order to perform scanning of a workpiece 50 mounted on the table 42. The scanning probe has a deflectable stylus for contacting the surface of the workpiece 50, and transducers (not shown) in the scanning probe measure the deflection of the stylus in the directions x,y,z, e.g. as described in U.S. Pat. No. 4,084,323 (incorporated herein by reference). The transducers in the scanning probe may measure the deflections of the stylus continuously or may take readings at a predetermined time interval. The outputs of the scanning probe transducers may be analogue or digital.

During scanning, the scanning probe continually transmits the data from its transducers to a receiver RX over a wireless (e.g. optical) link at a rate of, for example, 1000 samples per second. Although signal transmission is preferably wireless, e.g. optical or radio, a hard-wired transmission may be used instead.

The machine tool is programmed to move the scanning probe along a pre-programmed path relative to the workpiece 50 so as to scan the surface of workpiece 50. This is done under the control of a part program 20 for the workpiece 50, running in a controller 10. The part program causes demand signals to be sent on lines 22 to a servo feedback loop 24. The servo feedback loop 24 drives the motors to achieve the desired motion along the demanded path.

If the controller 10 in which the part program 20 runs is the conventional standard numeric control of the machine tool, then the servo feedback loop 24 also forms part of the controller 10. Alternatively, the controller 10 may be a separate computer, feeding the demanded path data to the servo feedback loop in the standard numeric control. It may form part of an interface between the probe and the machine's standard control.

As is conventional, the servo loop 24 receives position feedback information from measuring systems of the machine, such as encoders or resolvers (not shown) and collected at a predetermined frequency/rate controlled by a clock. The servo loop 24 drives the motors so as to tend to keep the actual path as indicated by the machine's measuring systems in accordance with the demanded machine path from the part program 20.

Figure 2:
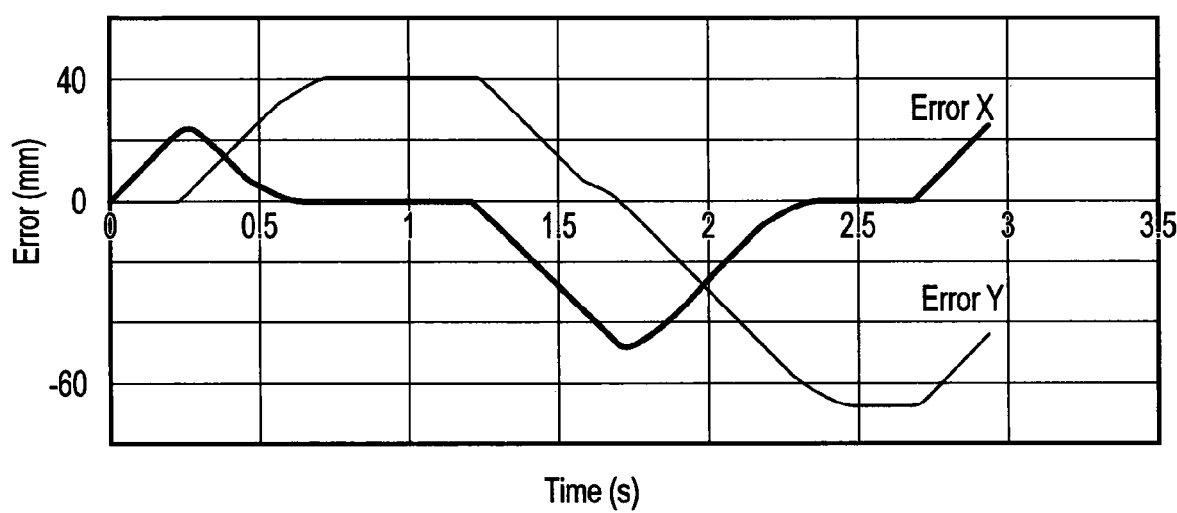
FIG. 2 shows position error for an example of prior art method using assumed position.

FIG. 2 shows the difference or error between actual position and assumed position for X- and Y-axes when measuring an example workpiece using the assumed position method of WO 2005/031254. The difference can be quantified if direct sampling of data in the servo feedback loop, from the outputs of the machine's encoders or other measuring devices is achieved. However, as noted above the modifications required for such sampling vary from one controller to another and may not be easy, or may not even be possible. As can be seen in FIG. 2 the Y-axis error is in excess of 60 mm at some points. In some cases this has been found to be because the method ignores unknowns in machine motion such as acceleration and interpolation parameters.

In accordance with the present invention, FIG. 1 shows a scanning probe 30 comprising an accelerometer 34. In this particular embodiment, the accelerometer is a MEMS accelerometer, specifically an ADXL 355 3-Axis MEMS Accelerometer produced by Analogue Devices Inc., Norwood, MA, USA. The outputs of the accelerometer 34 is communicated optically with the receiver RX. Here the accelerometer outputs 1000 samples per second.

The scanning probe 30 comprises a clock (not shown). The clock of the scanning probe 30 can be used to control sampling rate/frequency of the transducers used to measure deflection of the deflectable stylus 32. In the current embodiment, the accelerometer 34 is provided with an internal clock to drive acceleration data collection. However, a common clock may be used to control sampling data rate/frequency of the transducers and the accelerometer.

The drift between the clock(s) collecting data from the accelerometer 34 and/or transducers, and the clock controlling the machine positioning within controller 10 is ideally low.

In this embodiment, the accelerometer incorporates an analogue filter which attenuates any signal of a frequency greater than half the sampling frequency (the Nyquist frequency), this prevents aliasing of high frequency noise (one possible source of which is the machine tool) into lower frequencies. As the acceleration data measured with the accelerometer 34 contains noise, some of the noise, such as relating to machine vibration may be removed using a low pass filter.

It has also been found that noise due to vibrations of the spindle 40 (such as vibrations which occur when the spindle 40 is unlocked and rotated) can be reduced by ensuring the accelerometer 34 is located, in use, as close to the spindle axis as possible.

Figure 3:
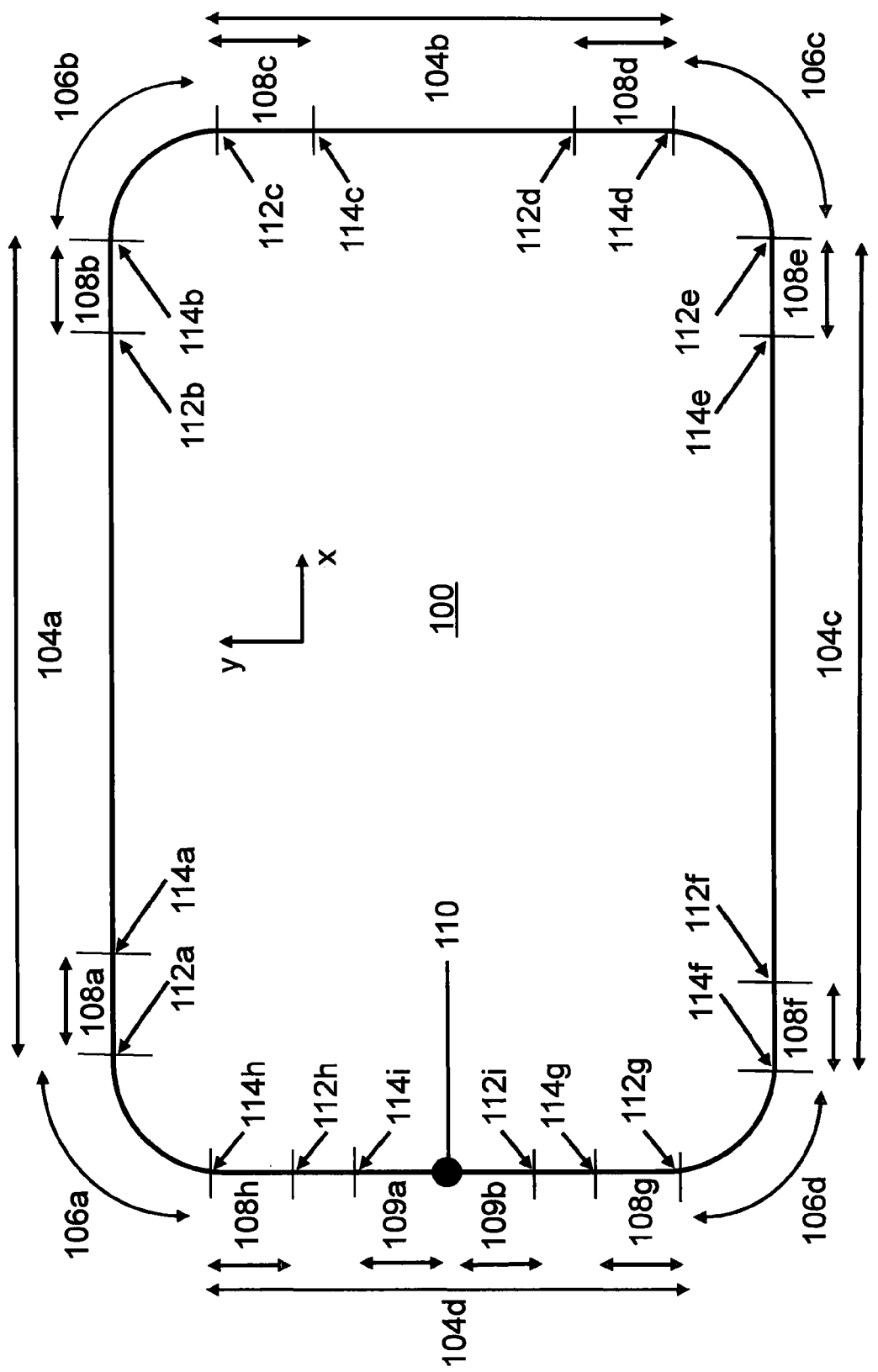
FIG. 3 illustrates a probe path.

FIG. 3 shows an embodiment of a pre-defined probe path 100, along which the scanning probe 30 is moved relative to the workpiece 50 so as to scan the surface of workpiece 50 with the stylus 32 of the scanning probe 30. The probe path 100 which is commanded by part program 20 is generally rectangular and comprises straight sections 104a, 104b, 104c, 104d (collectively straight sections 104) and rounded corners 106a, 106b, 106c, 106d (collectively rounded corners 106). In this embodiment, straight sections 104 are aligned with machine tool movement directions x, y, z, in this embodiment with machine tool movement directions x, y.

In order that the measurement cycle time is not excessively long, it is desirable for the scanning probe 30 to move along the probe path 100 without travelling unnecessarily slowly and without losing accuracy. It is often the case that in order to accurately advance the scanning probe 30 around rounded corners 106 the spindle 40 of the machine tool must go at a slower feedrate than is required to advance the probe along straight sections 104. The part program 20 may therefore command a first feedrate for rounded corners 106 and a second feedrate for straight sections 104.

Under control of part program 20 the stylus is brought into contact with workpiece 50 and scanned along a continuous path on the surface of workpiece 50. The part program 20 controls the speed of the movement along the probe path 100 such that the scanning probe 30 (and hence stylus 32) is slowed down for rounded corner sections 106 and sped up for straight sections 104.

When a user is setting a part program such as part program 20, it is typical that the shape of the path to be followed can be programmed as well as setting the desired feedrates for sections of the probe path. However, it is not typically (or at least not universally) possible to program acceleration values (and hence sections of a probe path 100 where accelerations occur). Such values may be dictated by the controller 10 and be dependent on the machine tool being able to perform the particular commanded motion. As such the values may vary from one machine tool to the next. There may be further variation on the same machine over time due to wear. This creates a situation in which the probe path 100 is known but where it is not always possible to know from the part program 20 alone where along a probe path 100 stylus deflection data was obtained. It is therefore possible to know "where" the probe will travel along a probe path 100 but not "when" it has reached a certain point along the probe path 100.

When setting the probe path 100 it is preferable that a user bear in mind one, some, many or all of the following design considerations; (i) the probe path 100 should be composed of sections of fixed feedrate with a small number of locations along the probe path 100 where the feedrate changes, (ii) there should be a dwell (or break in record) at any abrupt change in probe path direction, (iii) changes in feedrate should occur on reasonably straight sections of the probe path 100, (iv) the machine tool should be able to achieve the programmed feedrate on the corners, (v) sections of the probe path 100 should be long enough for the machine tool to accelerate to the desired feedrate. In the current embodiment the following design considerations for the probe path 100 may also be included; (vi) changes in feedrate should be at least 300 mm/minute, (vii) acceleration values of 5 milli-g should be achieved and preferably maintained for at least 0.1 s. This difference in feedrate between the first feedrate and the second feedrate sets a threshold which can avoid erroneous identification of an acceleration zone for the ADXL 355 3-Axis MEMS Accelerometer of the current embodiment.

FIG. 3 shows a point 110. In this embodiment the point 110 is the position along the probe path 100 at which the scanning of the workpiece 50 is started. The part program 20 controls the spindle 40 such that the stylus 32 is brought into contact with the workpiece 50 and a pre-determined displacement of the stylus 32 of the scanning probe 30 is achieved, this is often referred to as the 'engagement section' of the probe path 100. The engagement section of the probe path 100 is not shown in FIG. 3 for clarity. In the current embodiment after the engagement section has occurred the spindle 40 (and hence scanning probe 30) may be momentarily held stationary. Some machine tool controllers tend to control the motion of the spindle 40 to smooth out motion around a programmed abrupt change of direction (e.g. cause the spindle 40 to travel in a rounded manner around a corner rather than producing a sharp corner motion). Holding the spindle 40 stationary after the engagement section allows this tendency to be overcome. Being able to identify the end of the engagement section allows point 110 to be a known reference position along the probe path 100.

The part programme 20 commands the probe to advance along the probe path 100. In this embodiment, the part program 20 commands the machine tool to move the scanning probe 30 along the probe path 100 in a clockwise direction. The point 110 is chosen such that the at a point 114h the scanning probe 30 is being moved along the probe path 100 at a first feedrate commanded by the part program 20, i.e. the point 110 is chosen such that the distance to point 114h allows the machine tool to reach the first feedrate at (or before) the point 114h.

In the current embodiment, the scanning probe 30 is accelerated from rest at point 110 to reach a second feedrate (higher than the first feedrate), this occurs at a notional point 114i (here as the point 114i is not set in the part program 20 but depends on the actual acceleration of the machine tool, the exact location of the point 114*i* is not known and so described as notional), points 110 and 114*i* defining an initial acceleration zone 109*a*. During movement through the initial acceleration zone 109*a*, the scanning probe is accelerated from stationary to the second feedrate. The scanning probe is then moved at the second feed rate until notional point 112*h*. The scanning probe 30 is then decelerated (starting at a notional point 112*h*) to achieve the first feedrate at point 114*h*. The portion of the probe path 100 between notional point 112*h* and point 114*h* forms an acceleration zone 108*h*. The scanning probe 30 is advanced around rounded corner 106*a* at the first feedrate commanded by the part program 20. As shown the rounded corner 106*a* is a section of the probe path 100 between point 114*h* and 112*a*.

A first straight section 104*a* of the probe path 100 extends between point 112*a* and point 114*b*. Upon the probe reaching straight section 104*a* at point 112*a*, the part programme 20 commands the second feedrate. The point 114*b* is a point that marks the boundary between straight section 104*a* and rounded corner 106*b*. The part program 20 has been configured such that at the point 114*b* the machine tool is advancing the scanning probe 30 along the probe path 100 at the first feedrate.

At the point 112*a* the machine tool begins to accelerate the spindle 40 in order to move the scanning probe 30 along the probe path 100 at the second feedrate. FIG. 3 shows a notional point 114*a* where the second feedrate is achieved. The section of the probe path 100 between the point 112*a* and notional point 114*a* is defined as an acceleration zone 108*a*. It will be appreciated that the length of the acceleration zone will be dependent on the difference between the first feedrate and the second feedrate 122, as well as the rate at which the machine tool spindle 40 accelerates. As mentioned above, the rate at which the machine tool accelerates the spindle 40 depends on many factors which may vary between different machine tools, and/or which may vary on the same machine tool over extended time periods due to wear etc. It is therefore not possible to know, for every machine tool, the exact position of notional point 114*a* along the probe path 100.

Once the second feedrate 122 has been achieved, the scanning probe 30 is moved along straight section 104*a* at the second feedrate 122 until a notional point 112*b* is reached. As described above, the part program 20 requires that the scanning probe 30 be advanced along the probe path 100 at the first feedrate from the point 114*b*. In order that the first feedrate is achieved at the point 114*b*, the machine tool decelerates the spindle 40. The point at which the deceleration starts is shown in FIG. 3 as notional point 112*b*. A second acceleration zone 108*b* is defined by the points 112*b* and 114*b*. As with acceleration zone 108*a*, the length of acceleration zone 108*b* depends on factors that are machine tool specific and may vary over time due to wear etc. It is therefore not possible to know, for every machine tool, the exact positioning of point 112*b* along the probe path 100.

Next the part program 20 controls the machine tool to advance the scanning probe 30 around rounded corner 106*b* at the first feedrate. Upon reaching straight section 104*b* (which extends between points 112*c* and 114*d*), the part program 20 commands the second feedrate. The scanning probe 30 is accelerated in an acceleration zone 108*c* (between point 112*c* and notional point 114*c*). The scanning probe 30 is then advanced along the part of the straight section 104*b* between notional point 114*c* and notional point 112*d* at the second feedrate. The scanning probe 30 is decelerated along acceleration zone 108*d* (between notional point 112*d* and point 114*d*) in order to slow the movement of the scanning probe 30 from the second feedrate to the first feedrate.

The part program 20 controls the machine tool to advance the scanning probe 30 around rounded corner 106*c* at the first feedrate. Upon reaching straight section 104*c* (which extends between points 112*e* and 114*f*), the part program 20 commands the second feedrate. The scanning probe 30 is accelerated in an acceleration zone 108*e* (between point 112*e* and notional point 114*e*). The scanning probe 30 is then advanced along the part of the straight section 104*c* between notional point 114*e* and notional point 112*f* at the second feedrate. The scanning probe 30 is decelerated along acceleration zone 108*f* (between notional point 112*f* and point 114*f*) in order to slow the movement of the scanning probe 30 from the second feedrate to the first feedrate.

Next the part program 20 controls the machine tool to advance the scanning probe 30 around rounded corner 106*d* at the first feedrate. Upon reaching straight section 104*d* (which begins at point 112*g*), the part program 20 commands the second feedrate. The scanning probe 30 is accelerated in an acceleration zone 108*g* (between point 112*g* and notional point 114*g*). The scanning probe 30 is then advanced along the part of the straight section 104*d* between notional point 114*g* and notional point 112*i* at the second feedrate. The scanning probe 30 is decelerated along final acceleration zone 109*b* (between notional point 112*i* and point 110) in order to slow the movement of the scanning probe 30 from the second feedrate to stationary. Bringing the probe to stationary may allow the point 110 to be used as a known reference position on the probe path 100.

Accelerations zones 108*a*-108*h* are collectively termed acceleration zones 108. Acceleration zones 108*a*,108*c*, 108*e*, 108*g* are acceleration zone where the scanning probe is accelerated from the first feedrate to the second feedrate. Acceleration zones 108*b*,108*d*, 108*f*, 108*h* are acceleration zone where the scanning probe is decelerated from the second feedrate to the first feedrate. In the current embodiment, the part program 20 has been configured such that acceleration zones 108 are located on straight sections of the probe path 100.

Initial acceleration zone 109*a* is an acceleration zone where the scanning probe is accelerated from stationary after the engagement section. Final acceleration zone 109*b* is an acceleration zone where the scanning probe is decelerated to stationary. After final acceleration zone 109*b* the stylus 32 of the scanning probe is removed from contact with the surface of the workpiece 50. Initial acceleration zone 109*a* and final acceleration zone 109*b* are collectively known as acceleration zones 109. In the current embodiment, the part program 20 has been configured such that acceleration zones 109 are located on straight sections of the probe path 100.

In this way the scanning probe 30 is transported along the probe path 100, with measurement information relating to the object to be measured being gathered starting at point 110 and finishing at point 110. The point 110 may be a user defined point and could be located elsewhere along the probe path 100, thus acceleration zones 109 may be located elsewhere along the probe path 100.

In the current embodiment, the scanning probe 30 continually transmits the data from the transducers and accelerometer to the receiver RX over the wireless link simultaneously. In this way, it is possible to collect all data in a single pass of the scanning probe along the probe path 100.

It will be appreciated that when travelling at a constant speed, such as when the probe is advanced along at least a part of the straight section 104*a* of probe path 100 at the second feedrate there is substantially no acceleration if the commanded feedrate is maintained. It will further be appreciated that when the probe is traveling at a constant speed while being advanced around the rounded corners 106 at the first feedrate, there will be acceleration normal to the probe path 100 due to the curved nature of the probe path 100, but substantially no acceleration along (i.e. tangential to) the probe path 100 if the commanded feedrate is maintained.

Figure 4:
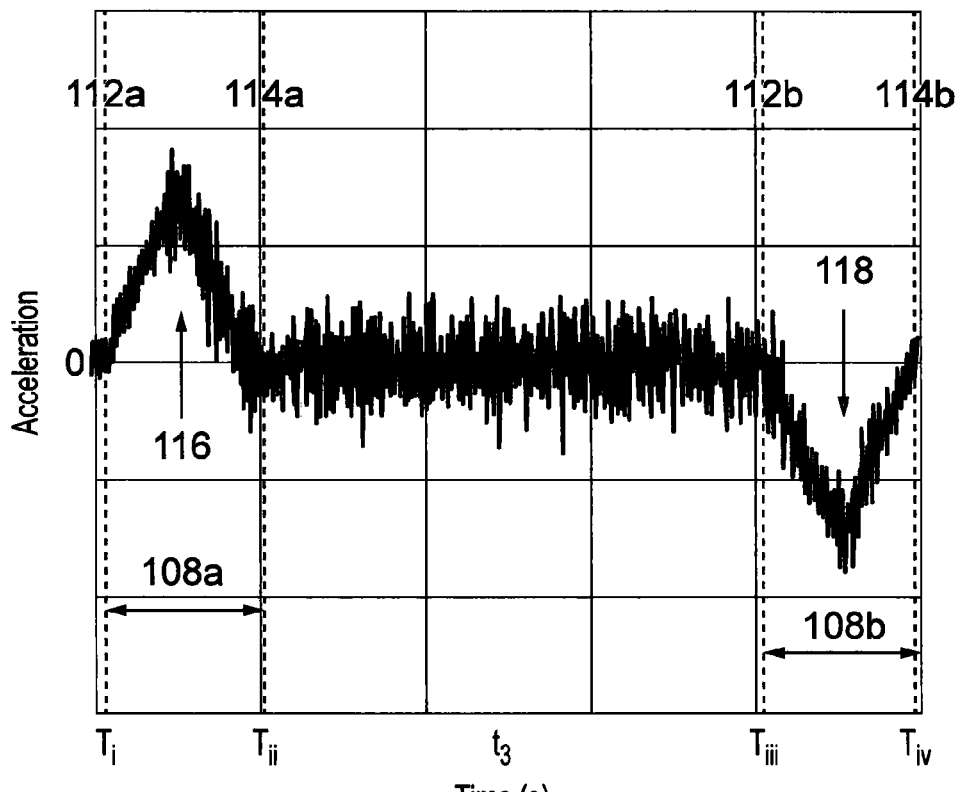
FIG. 4 shows measured acceleration data for a section of the probe path of FIG. 3.

FIG. 4 shows acceleration along the probe path 100 as the scanning probe 30 is advanced along straight section 104a of the probe path 100 plotted against time. The times when the probe is in acceleration zones 108a, 108b can be identified from such data. Here acceleration zone 108a can be seen as a first peak 116 occurring between a first time $T_i$ and a second time $T_{ii}$. Acceleration zone 108b can be seen as a second peak 118 occurring between a third time T and a fourth time $T_{iv}$. At time $T_i$ the probe is at a position 112a along the probe path 100, at time $T_{ii}$ the probe is at a position 114a along the probe path 100, at time $T_{iii}$ the probe is at a position 112b along the probe path 100, and at time $T_{iv}$ the probe is at a position 114b along the probe path 100. As the acceleration in acceleration zone 108a is positive, the first peak 116 is positive. Whereas, as the acceleration in acceleration zone 108b is negative (i.e. a deceleration), the second peak 118 is negative.

It is possible to obtain a position measurement merely by double integrating the acquired acceleration data, however any error in the measured acceleration data can lead to a large error in calculated position data. For example, a constant error in measured acceleration data when integrated to produce velocity (feedrate) data will introduce an error which varies linearly with respect to time in the velocity data, and further integration of the velocity data to obtain position data will produce a quadratic error in the position data. Thus, when using double integration of measured acceleration data to provide position information particular attention must to paid to the size of any error and double integration of acceleration data may only be suitable for short periods. As can be seen from FIG. 4, the acceleration error is not a constant error but contains noise, as such the typical error is proportional to the noise density multiplied by the scan duration to the 3/2 power.

Instead of double integrating acceleration data, more accurate position information can be extracted from the acceleration data by processing as described below. In general, machine tools are capable of holding a commanded feedrate once the feedrate has been achieved, as mentioned above this will produce sections of zero acceleration along the probe path 100. The data in FIG. 4 comprises acceleration data obtained from point 112a of the probe path 100 to point 114b of the probe path 100. In this data there is an acceleration of the probe along the probe path 100 as the probe is accelerated from the first feedrate of the probe path 100 applied for the rounded corner 106a, until the second feedrate 122 for the straight section 104a is achieved at point 114a. The scanning probe 30 is then advanced along the probe path 100 at the second feedrate 122 (constant speed along the probe path 100) and a second acceleration zone 108b can be seen within the acceleration data of FIG. 4 (between points 112b, 114b). The acceleration data shown in FIG. 4 is generally symmetrical having substantially similar acceleration magnitudes for the two acceleration zones 108a, 108b described. This need not be the case. As the acceleration profile will be dictated by the machine tool the acceleration between points 112a and 114a need not be similar to the acceleration between points 112b and 114b and the data may not be symmetrical.

The accelerations zones 108 and 109 are identified from the acceleration data as peaks within the acceleration data, such as peaks 116, 118. Identification of the acceleration zones 108, 109 allows identification of the regions of fixed feedrate.

Next, a time $t_1, t_2 \ldots t_N$ is selected for each fixed feedrate section and an initial distance value $d_1, d_2 \ldots d_N$ is assigned to each of the times $t_1, t_2 \ldots t_N$. Each time $t_1, t_2 \ldots t_N$ can be any time that falls within each fixed feedrate section.

The distance value $d_1, d_2 \ldots d_N$ may be chosen based on known positions along the probe path 100 or may be chosen by any other method.

Figure 10:
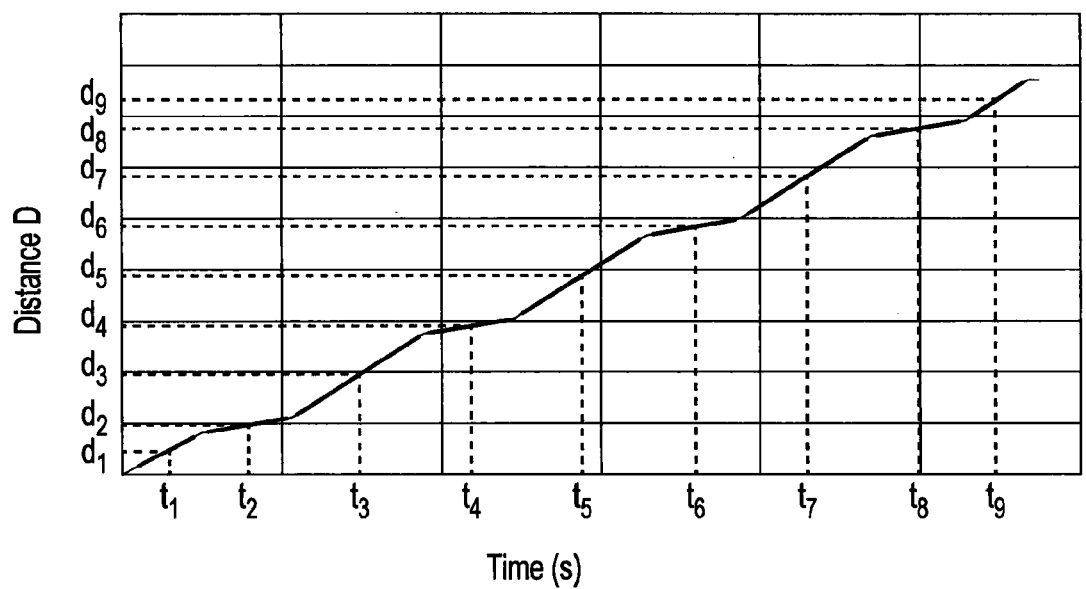
FIG. 10 is a plot of position vs time for data pairs $d_N$, $t_N$.

Referring also to FIG. 10 shows, probe path 100 distance information plotted against time using data pairs $t_N, d_N$ is shown for the whole probe path 100. The information defines a distance D along the probe path 100. Here the distance D is the distance along the probe path (in a clockwise direction) from the point 110 described in connection with FIG. 3. The point 110 is a known position along the probe path 100. This means that the beginning of acceleration zone 109a and the end of acceleration zone 109b for the current embodiment are known.

Data pair $t_1, d_1$ shown in FIG. 10 thus corresponds to a point along the probe path 100 between notional point 114i and notional point 112h (as shown in FIG. 3). Data pair $t_2, d_2$ corresponds to a point along the probe path 100 between point 114h and point 112a. Data pair $t_3, d_3$ corresponds to a point along the probe path 100 between notional point 114a and notional point 112b ($t_3$ is also shown in FIG. 4). Data pair $t_4, d_4$ corresponds to a point along the probe path 100 between point 114b and point 112c. Data pair $t_5, d_5$ corresponds to a point along the probe path 100 between notional point 114c and notional point 112d. Data pair $t_6, d_6$ corresponds to a point along the probe path 100 between point 114d and 112e. Data pair $t_7, d_7$ corresponds to a point along the probe path 100 between notional point 114e and notional point 112f. Data pair $t_8, d_8$ corresponds to a point along the probe path 100 between point 114f and point 112g. Data pair $t_9, d_9$ corresponds to a point along the probe path 100 between notional point 114g and notional point 112i. This allows, for example, the distance along the tool path 100 at any time t, between the point 114a and point 112b to be approximated by assuming the machine moves at commanded second feedrate between the times $T_{ii}$ and $T_{iii}$ (including point $t_3$).

In order to provide a complete set of distance information D, the gaps between the fixed feedrate sections need to be filled. These gaps correspond to the acceleration zones. The measured acceleration corresponding to the appropriate acceleration zone is used to fill the gaps between the fixed feedrate sections as will now be described by reference to FIGS. 5 to 7.

Figure 5:
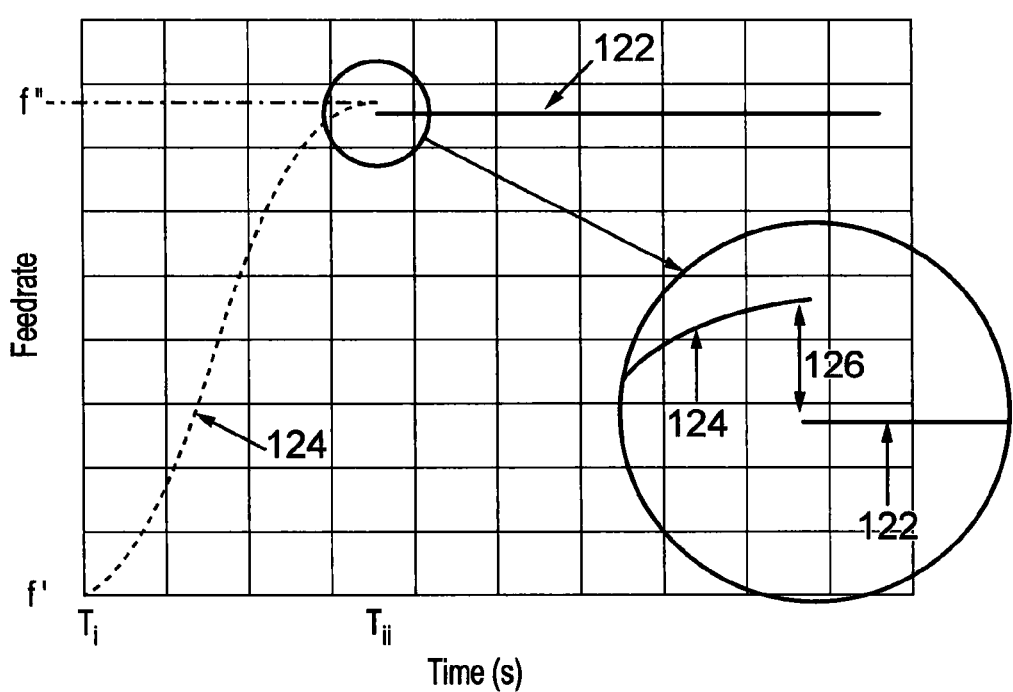
FIG. 5 shows calculated feedrate based on measured acceleration data and commanded feedrate data for part of the probe path of FIG. 3.

FIG. 5 corresponds to feedrate in the period between point 112a (the beginning of the identified first peak 116 in the acceleration data) and a point between points 114b and 112b of FIG. 4. The measured acceleration data between points 112a and 114a has been integrated to give feedrate data 124. After position 114a the commanded second feedrate 122 is plotted. As can be seen the feedrate has a value of f' at $T_i$ (which corresponds to the first feedrate) and a value of f'' at a time $T_{ii}$. It can be seen that f'' is greater than the second feedrate 122. A discontinuity 126 exists between the feedrate data 124 and the second feedrate 122. This may be due to errors present in the acceleration data (such as noise), or to the positioning of the fixed feedrate data (e.g. due to values of $(d_2, t_2), (d_3, t_3)$ etc). In order to compensate for this error a linear correction $v_c$ of the form $$v_c = mt + k \quad (1)$$

where t is time and m and k are constants, is applied to the feedrate data that is derived from the acceleration data. The values of m and k are picked so as to remove the discontinuity 126 from the data and will be different for different situations and accelerometers. This process assumes that the feedrates before and after the acceleration zone are known, for example that the commanded feedrates have been achieved. In this embodiment, it is assumed that the probe holder of the machine tool is moving at the first feedrate immediately prior to a time $T_i$ and that the probe holder of the machine tool achieves the second feedrate 122 at time $T_{ii}$.

Figure 6:
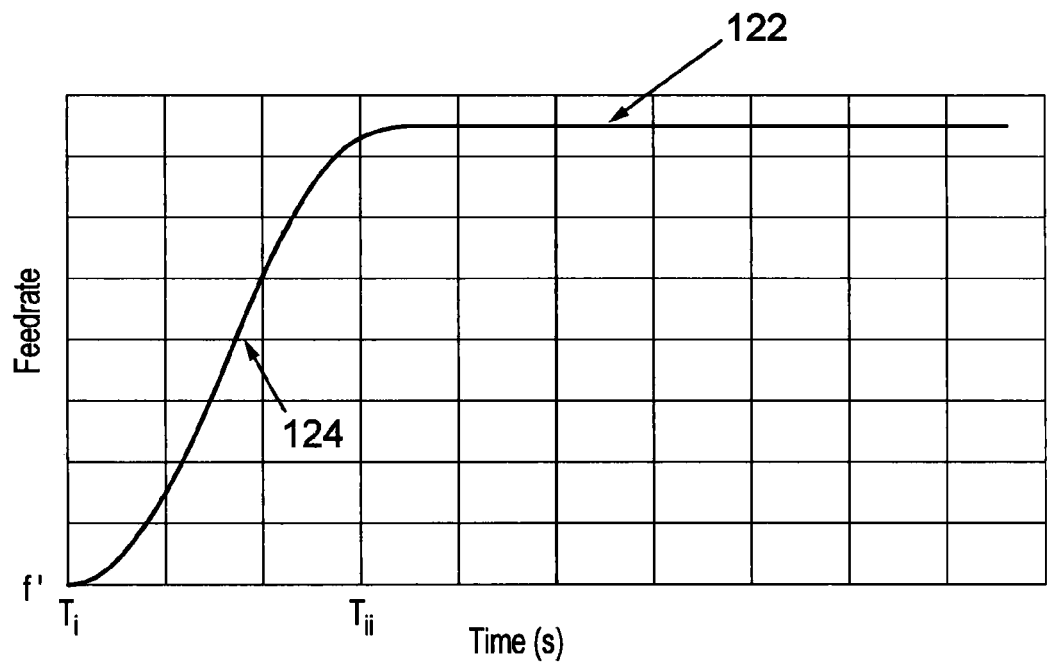
FIG. 6 shows calculated feedrate based on adjusted acceleration data and commanded feedrate data for part of the probe path of FIG. 3.

FIG. 6 shows removal of discontinuity 126 as the scanning probe is accelerated from the first feedrate at time $T_i$ to the second feedrate at time $T_{ii}$, as the discontinuity 126 would represent an infinite acceleration. At times not forming part of the identified acceleration peaks (such as peaks 116, 118 identified from the acceleration data shown in FIG. 4 as described above), the appropriate commanded feedrate is assumed.

Figure 7:
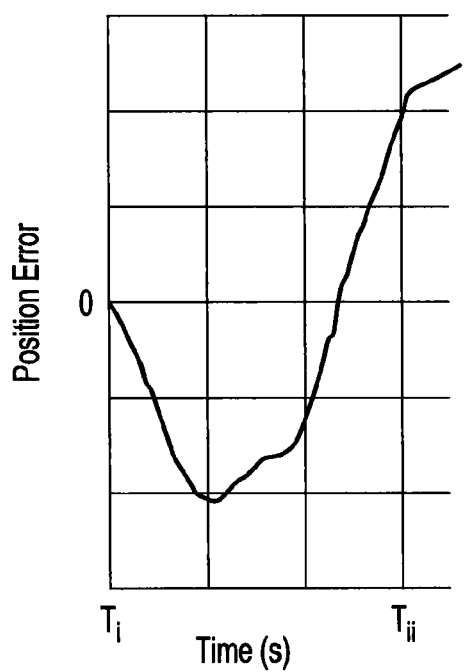
FIG. 7 shows position error for the data of FIG. 6.

FIG. 7 shows the additional position error corresponding to the feedrate shown in FIG. 6 and the feedrate of the spindle 40 as measured in order to demonstrate the accuracy of the feedrate data at this stage. Accurate feedrate data for the spindle 40 can be obtained by direct sampling of information from the machine tool. As discussed above, it is not practical or may not be possible to obtain such information for every machine tool.

Figure 8:
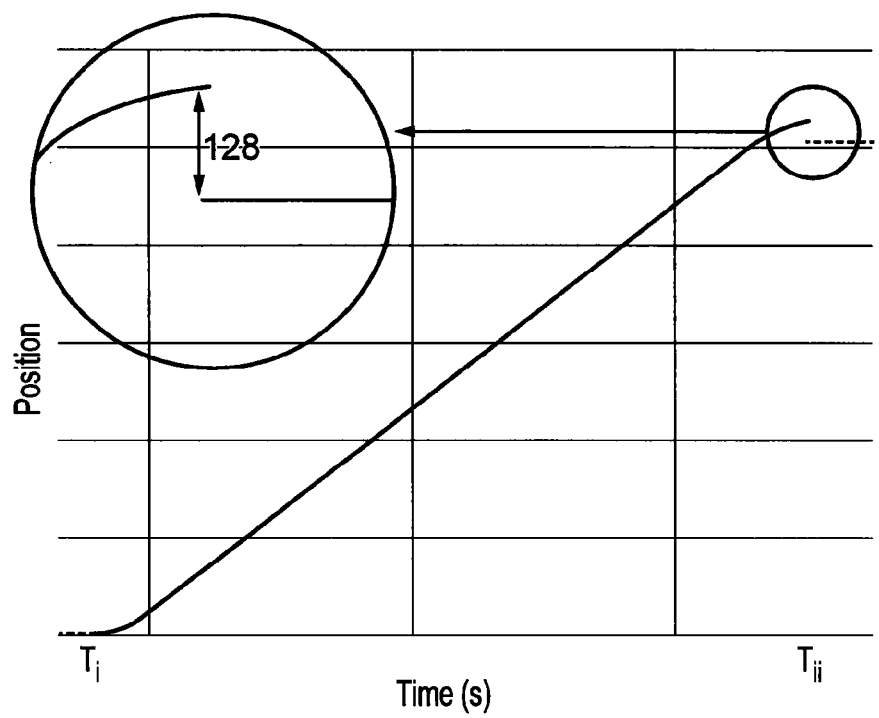
FIG. 8 shows calculated position data based on feedrate data of FIG. 6.
Figure 9:
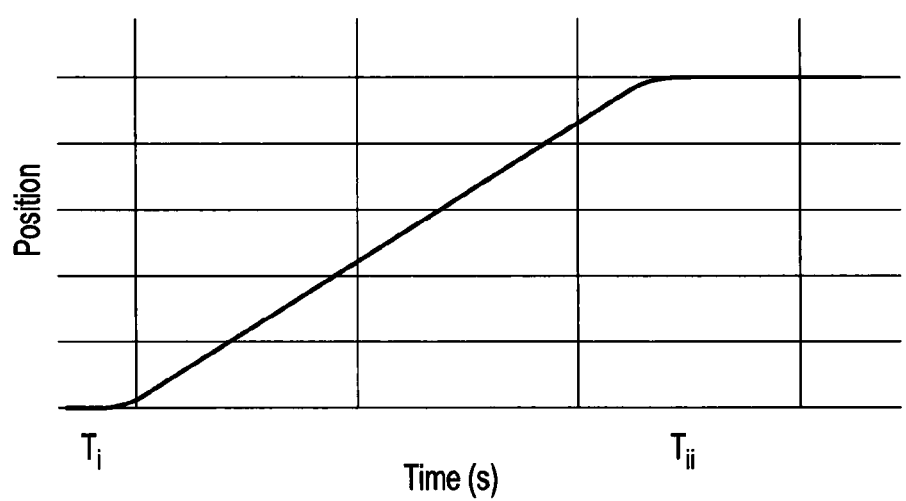
FIG. 9 shows position data based on adjusted feedrate data.

FIG. 8 shows the position information obtained by integrating the feedrate information shown in FIG. 6. As can be seen in FIG. 8, there exists a discontinuity 128. Discontinuity 128 represents a physically unreal situation (such a step change in position would require an infinite acceleration and hence did not occur). The data shown in FIG. 8 can be corrected using a correction $p_c$ of the form $$p_c = at^3 + bt^2 + ct + d \qquad (2)$$

where t is time and a, b, c and d are constants, is applied to the position data of FIG. 6. The values of a, b, c and d are picked so as to remove the discontinuity 128 from the position data while ensuring that feedrates at $T_i$ and $T_{ii}$ are not affected. The values of a, b, c and d will be different for different situations. The corrected position data is shown in FIG. 9 and represents a physically possible path.

The complete set of distance data D is converted into acceleration data by differentiating twice to give fitted acceleration data. The fitted acceleration data and the measured acceleration data are compared. The parameters $d_N$ are adjusted and calculation of position information corresponding to acceleration zones 108, 109 is repeated for the new parameters $d_N$. This process is repeated until the difference between the fitted and the measured accelerations is minimised. The parameters $d_N$ may be adjusted by using a least squares method, for example a non-linear least squares method such as the Levenberg-Marquardt non-linear solver.

When using an ADXL 355 3-Axis MEMS Accelerometer, the noise is dominated by high frequency machine vibration. By filtering the residuals, preferably by applying a Gaussian filter, before passing to the solver the quality of fit can be improved.

This process provides a method of associating distance along the probe path 100 with time. As deflection data collected by the scanning probe 30 is recorded against a time, the method described above provides a way to associate deflection data with a distance along a probe path 100.

Figure 11:
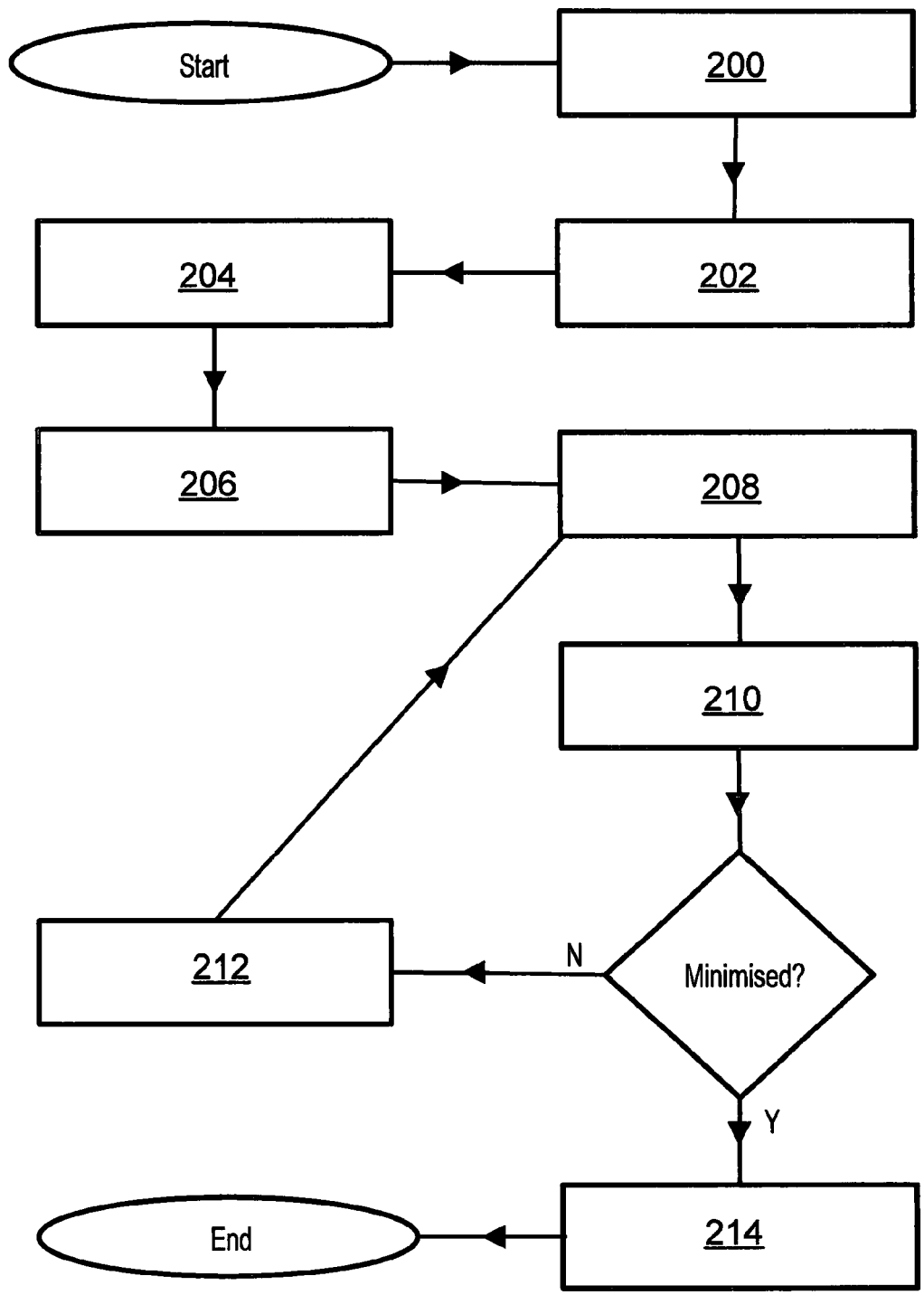
FIG. 11 is a flow chart illustrating a method according to an embodiment of the invention.

FIG. 11 is a flow chart illustrating the above described method of matching deflection data with a position along a probe path 100. At step 200 a probe path 100 is obtained, which includes commanded feedrates for each section of the probe path 100 as well as start positions and end positions. Next at step 202 acceleration data and deflection data is collected. The acceleration data collected is analysed for acceleration peaks which occur along the probe path 100 in order to identify when acceleration zones 108, 109 occur. At step 204 the sections between the acceleration zones 108, 109 are assigned the appropriate fixed feedrates. At step 206 position data for the fixed feedrate sections is determined, an arbitrary time $t_1, t_2 \ldots t_N$ is selected for each fixed feedrate section and an initial distance value $d_1, d_2 \ldots d_N$ is assigned to each of the times $t_1, t_2 \ldots t_N$. In order to provide a complete set of distance data D, at step 208 the distance D information between the fixed feedrate sections (i.e. acceleration zones 108, 109) is filled in using position information derived from the acceleration data in a realistic manner. In this embodiment, this is achieved by applying a correction $v_c$ to the feedrate data such that feedrate data is consistent with realistic (i.e. physically possible, without discontinuity) situations, and a second correction $p_c$ is applied to the position data such that the position data (and feedrate data which can be derived therefrom) is consistent with realistic (i.e. physically possible, without discontinuity) situations.

Once the complete set of distance data D has been obtained from step 208, at step 210 the complete set of distance data D is converted into acceleration data by differentiating twice to give fitted acceleration data. The fitted acceleration data and the measured acceleration data are compared. After the first comparison, the method passes to step 212. At step 212 the parameters $d_N$ are adjusted and the position data for the fixed feedrate sections recalculated based on the new value for $d_N$. The parameters $d_N$ may be adjusted in step 212 by using a least squares method, for example a non-linear least squares method, such as the Levenberg-Marquardt non-linear solver. Steps 208 to 210 are repeated. After step 210 a comparison is made between the measured acceleration data and the fitted acceleration data. Once the comparison after step 210 finds the difference between the fitted and the measured accelerations is minimised the method proceeds to step 214. If the difference between the measured acceleration data and the fitted acceleration data is not minimised, the method passes to step 212. At step 214, the distance-time information so obtained is used to associate time based deflection information with a distance along the probe path 100.

Before running the above described method, the raw output of the accelerometer 34 may need to be calibrated. To calculate a null value for the accelerometer 34 two seconds of data may be gathered while the machine is not moving. The average reading from each axis of the accelerometer 34 may be subtracted from all subsequent reading of that axis. This may be used to remove the null and remove gravity. If such a calibration step is used then the accelerometer readings will be sensitive to rotation of the accelerometer. Such a calibration is suitable for use if movement is restricted to 3-axis measurement. If rotation is desired, for example 5-axis movement, then further calibration steps to find the null values for different orientations of the accelerometer may be performed (such further calibration steps will not be described here).

A second calibration step may be performed in order to determine the sensitivity of each accelerometer axis, the orientation of the accelerometer 34, and the machine axis configuration. Here a series of circles of know radius in the X-Y plane, X-Z plane, and Y-Z plane are performed. As the output from each accelerometer axis is expected to comprise sine and cosine waves offset by the null value and having an amplitude corresponding to the centrifugal force the accelerometer 34 experiences, an algorithm can be used to fit sine waves to the accelerometer data so obtained.

The ADXL 355 3-Axis MEMS Accelerometer of the current embodiment has been observed to show linear behaviour. Other suitable calibration routines may be configured to compensate for any non-linearity in the accelerometer.

A second embodiment will now be described. The second embodiment is similar to the first embodiment described above but acceleration data and deflection data are not measured simultaneously. This may have particular application where the scanning probe 30 is battery operated and outputting acceleration data and deflection data simultaneously may reduce battery life to an unacceptable level.

In this embodiment, an acceleration pass is carried out that comprises advancing the scanning probe 30 along the probe path 100 while acceleration data is measured and transmitted via the optical interface. A deflection pass is carried out that comprises advancing the scanning probe 30 along the probe path 100 while deflection data is measured and transmitted optically. The deflection pass may be carried out after the acceleration pass as is the case in this embodiment.

In this second embodiment, it may be necessary to match the timescales of the data (e.g. to align the start times for both sets of data). During the engagement section of the probe path 100 the spindle 40 is controlled for initially bringing stylus 32 of the scanning probe 30 into contact with the workpiece 50 in order to achieve a predetermined deflection of stylus 32 prior to moving the scanning probe 30 along the probe path 100. Here the spindle 40 is moved in a direction normal to the probe path 100 in order that the spindle 40 arrives at the point 110 where scanning along the probe path 100 is started. Acceleration data is collected during the engagement section of the acceleration pass and a dwell is provided immediately after the engagement section. Such a dwell may be about 0.05 seconds. The object to be measured need not be mounted on the machine tool during the acceleration pass. During the engagement section of the deflection pass, deflection data is collected and a dwell provided immediately after the engagement section. Such a dwell may be about 0.05 seconds in order to match the dwell of the acceleration pass. As the deflection of the stylus 32 during the engagement section is due to machine motion, the deflection data during the engagement section is characteristic of machine motion. The deflection data collected during the engagement section of the deflection pass is differentiated twice to provide stylus deflection acceleration data. As the stylus 32, during the engagement section is being moved onto a point on the surface of the workpiece 50 by movement along a direction normal to the part of the probe path 100 which contains start point 110, the stylus deflection acceleration data can be matched with the acceleration data collected during lead-on from the acceleration pass. This allows corresponding times during the acceleration pass and the deflection pass to be identified as the calculated stylus deflection acceleration data for the engagement section of the deflection pass will have similar characteristics to the acceleration data measured during the engagement section for the acceleration pass.

In a third embodiment, the method comprises an acceleration pass and a deflection pass. Spindle position data is collected during the engagement section of the acceleration pass or may be derived from the acceleration data such as by using the method described above. The spindle position data may be plotted as distance of spindle 40 from point 110 of probe path 100, i.e. distance from the end of the engagement section of the probe path 100. During the engagement section of the deflection pass, deflection of the stylus 32 is measured. This can be plotted as deflection from maximum deflection of the engagement section. As the profile of the spindle position as a function of time corresponds to the profile of the probe deflection as a function of time during at least the final part of the engagement section, the profiles of the spindle position and the profile of the probe deflection can be matched to align the data between the acceleration pass and the deflection pass.

In a fourth embodiment, the method comprises an acceleration pass and a deflection pass. Acceleration data and deflection data may be aligned using information obtained during a disengagement section of the probe path 100 (not shown). The disengagement section occurs at the end of the measurement cycle when the point 110 is reached after the scanning probe has been advanced along the probe path 100. The disengagement section may occur along a direction normal to the section of the probe path 100 containing point 110. During the disengagement section the contact between the stylus 32 of the scanning probe 30 is broken and the spindle 40 of the machine tool moves the probe away from the workpiece 50. This may allow the workpiece 50 to be removed from the machine tool or may allow the scanning probe 30 to be removed from the spindle 40 of the machine tool to allow for further machining of the workpiece 50.

In a fifth embodiment comprising an acceleration pass and a deflection pass, acceleration data and deflection data may be aligned using information obtained during engagement sections and during disengagement sections.

While the first embodiment described above is described in conjunction with an ADXL 355 3-Axis MEMS Accelerometer, other accelerometers may be used. The accelerometer 34 may be a MEMS accelerometer. The accelerometer may have an analogue to digital converter, or a separate analogue to digital converter may be provided. The acceleration data of the accelerometer is passed to the analogue to digital converter, which may be mounted on an integrated circuit board along with the accelerometer. The analogue to digital converter may be configured to prevent aliasing of high frequency noise (such as machine vibration) into lower frequencies. An analogue to digital converter may be provided where accelerometer noise density is less than the resolution of the accelerometer divided by the square root of the sampling frequency.

In the first embodiment described above a single accelerometer 34 was provided that forms part of the scanning probe 30. This need not be the case and the accelerometer 34 need not be provided as part of the scanning probe 30. The accelerometer 34 may be affixed to the machine tool separate from the scanning probe. The accelerometer 34 or an additional accelerometer may be provided on the table 42 of the machine tool. An accelerometer may be affixed to the object to be measured. This allows relative movement of the workpiece 50 and probe 30 brought about by movement of the table 42 to be monitored.

The choice of the position 110 on the tool path 100 may be at the start of section of desired constant feedrate, such as 112*a* (the section of constant desired feedrate being straight section 104*a* in this case), 114*b* (the section of constant desired feedrate being rounded corner 106*b* in this case) etc. In still further embodiments, the position 110 on probe path 100 may be any position on probe path 100.

The correction $v_c$ and/or the correction $p_c$ may have a different form from that disclosed in conjunction with the first embodiment or equivalent corrections could be applied at different stages of the method. For example, the correction $v_c$ (which varies linearly with respect to time and is applied to feedrate data), has an equivalent correction a, which is a constant correction (with respect to time) and which would be applied to acceleration data.

Forming the initial position information (such as described in relation to step 204 of FIG. 11) may be carried out using entirely assumed positions, or known start and end positions along the probe path and assumed positions therebetween.

The scanning probe may be a non-contact probe such as a capacitive probe, an inductive probe, or a video probe. The method may also be used with other types of measurement probes.

The invention claimed is:

1. A method for measuring an object using a scanning probe carried by a machine tool, the machine tool having a probe holder for retaining the scanning probe and a carrier for carrying the object to be measured, the method comprising the steps of;
   (i) using the machine tool to move the probe holder relative to the carrier along a pre-programmed scan path, the pre-programmed scan path comprising at least one first region where the movement along the pre-programed scan path is at a first feedrate, at least one second region where the movement along the pre-programed scan path is at a second feedrate, and at least one acceleration zone located between the at least one first region and the at least one second region,
   (ii) measuring acceleration between the probe holder and the carrier using at least one accelerometer whilst the pre-programmed scan path is traversed,
   (iii) collecting probe data whilst the pre-programmed scan path is traversed with the scanning probe retained by the probe holder and the object carried by the carrier, the scanning probe thereby scanning the surface of the object, and
   (iv) using the acceleration measured in step (ii) to identify at least one acceleration zone of the pre-programmed scan path and thereby determine one or more positions along the scan path at which the probe data of step (iii) were collected.

2. A method according to claim 1 wherein step (ii) is performed with the probe in the probe holder.

3. A method according to claim 1 wherein step (ii) is performed with the object to be measured carried by the carrier.

4. A method according to claim 1 wherein step (iv) comprises matching a time base of the measured acceleration and a time base of the probe data based on a data collection rate of the measured acceleration and a data collection rate of the probe data.

5. A method according to claim 1 wherein the pre-programmed scan path comprises an engagement section in which the probe is brought into a measurement relationship with the object to be measured.

6. A method according to claim 5 wherein a dwell is provided after the engagement section.

7. A method according to claim 5 wherein step (iv) comprises matching a time base of the measured acceleration and a time base of the probe data based on a data collection rate of the measured acceleration and a data collection rate of the probe data, and the time base of the measured acceleration and the time base of the probe data comprises are matched based on measured acceleration and probe data characteristic of the engagement section.

8. A method according to claim 1 wherein a correction is applied to the measured acceleration of the at least one acceleration zone or to information derived therefrom in order to fit the acceleration data of the at least one acceleration zone to be consistent with at least one of the first feedrate, the second feedrate, and at least one known reference position.

9. A method according to claim 8, comprising the steps of
   (v) deriving feedrate data from the measured or corrected acceleration collected in the at least one acceleration zone, and
   (vi) applying a correction to the feedrate data to ensure the feedrate data is consistent with the at least one reference position.

10. A method according to claim 1 wherein step (ii) is performed during a first traverse of the pre-programmed scan path, and step (iii) is performed during a second traverse of the pre-programmed scan path.

11. A method according to claim 1 wherein step (ii) and step (iii) are performed concurrently.

12. A method according to claim 1 wherein the scanning probe is a contact probe comprising a housing, a stylus for contacting an object to be measured and one or more transducers for measuring deflection of the stylus relative to the housing.

13. A method according to claim 1 comprising passing the acceleration data of step (ii) and the probe data of step (iii) to an associated probe interface over a wireless communications link.

14. A method according to claim 1 wherein the first feedrate is different to the second feed rate.

15. A method according to claim 1 wherein the first feedrate or the second feed rate is zero.

16. A method according to claim 1 wherein the first feedrate and/or the second feedrate are non-zero.

17. An apparatus comprising a machine tool, a scanning probe for acquiring probe data, and a controller,
   the machine tool having a probe holder for retaining the scanning probe, a carrier for carrying an object to be measured, and at least one accelerometer for measuring acceleration of the probe holder relative to the carrier,
   the controller being configured to carry out the steps of;
   (i) using the machine tool to move the probe holder relative to the carrier along a pre-programmed scan path, the pre-programmed scan path comprising at least one first region where the movement along the pre-programed scan path is at a first feedrate, at least one second region where the movement along the pre-programed scan path is at a second feedrate, and at least one acceleration zone located between the at least one first region and the at least one second region,
   (ii) measuring acceleration between the probe holder and the carrier using the at least one accelerometer whilst the pre-programmed scan path is traversed,
   (iii) collecting probe data whilst the pre-programmed scan path is traversed with the scanning probe retained by the probe holder and the object carried by the carrier, the scanning probe thereby measuring the surface of the object, and (iv) using the acceleration measured in step (ii) to identify at least one acceleration zone of the pre-programmed scan path and thereby determine one or more positions along the scan path at which the probe data of step (iii) were collected.

18. A computer implemented method for matching scanning probe data to positions along a pre-programmed scan path, the pre-programmed scan path being the path along which a machine tool probe holder moved relative to a carrier and comprising at least one first region where movement along the pre-programmed scan path is at a first feedrate, at least one second region where the movement along the pre-programmed scan path is at a second feedrate, and at least one acceleration zone located between the at least one first region and the at least one second region, the method comprising the steps of;
(i) receiving acceleration data, the acceleration data describing the measured acceleration of the probe holder relative to the carrier whilst the pre-programmed scan path is traversed,
(ii) receiving probe data collected by a scanning probe held by the probe holder whilst the pre-programmed scan path is traversed,
(iii) using the acceleration data received in step (i) to identify at least one acceleration zone of the pre-programmed scan path and to thereby determine one or more positions along the scan path at which the probe data of received in step (ii) were collected.

19. A computer program product comprising instructions that, when executed on a computer, cause the computer to perform the steps of claim 18.

20. A computer-readable storage medium comprising instructions which, when executed by a computer, carry out the method of claim 18.

\* \* \* \* \*